United States Patent
Overlach et al.

[11] Patent Number: 5,507,099
[45] Date of Patent: Apr. 16, 1996

[54] DEVICE FOR MEASURING DISTORTION IN CYLINDERS

[75] Inventors: Knud Overlach, Ettlingen; Manfred Wamser, Karlsruhe, both of Germany

[73] Assignee: Pietzsch Automatisierungstechnik GmbH, Ettlingen, Germany

[21] Appl. No.: 210,314

[22] Filed: Mar. 17, 1994

[30]    Foreign Application Priority Data

Mar. 20, 1993 [DE] Germany .................. 43 09 082.6

[51] Int. Cl.⁶ .................................................. G01B 5/016
[52] U.S. Cl. ........................ 33/561; 33/558; 33/DIG. 13
[58] Field of Search ........................ 33/556, 558, 559, 33/561, DIG. 13, 572, 503

[56]           References Cited
            U.S. PATENT DOCUMENTS

| 3,945,124 | 3/1976 | Jacoby et al. .................... 33/556 |
| 4,621,434 | 11/1986 | Hirschmann ...................... 33/503 |
| 4,879,916 | 11/1989 | Juillerat ...................... 33/561 X |
| 5,012,591 | 5/1991 | Asakawa ...................... 33/558 X |

FOREIGN PATENT DOCUMENTS

| 0501710 | 9/1992 | European Pat. Off. ............. 33/559 |
| 4031710 | 2/1992 | Japan ........................... 33/503 |
| 1783273 | 12/1992 | U.S.S.R. ....................... 33/559 |

*Primary Examiner*—Thomas B. Will
*Attorney, Agent, or Firm*—Max Fogiel

[57]             ABSTRACT

An arrangement for measuring distortion in cylinders. A sensor projects straight out of the end of a motion-transmitting arm. The arm can be both translated and rotated. The sensor accommodates a probe that probes the geometry of the surface of the cylinder. The sensor has a distortion-measuring structure accommodated in the head of a surface-geometry probe and a check for axially secured and undeflected tensioning of the probe. The probe is an elongated geometry-probing pin. The structure is securely tensioned remote from the chuck in the vicinity of a structure-attachment section in the head. The structure includes at least one zone of attenuation between the chuck and the structure-attachment section and has a resilient section and a strain gauge.

8 Claims, 3 Drawing Sheets

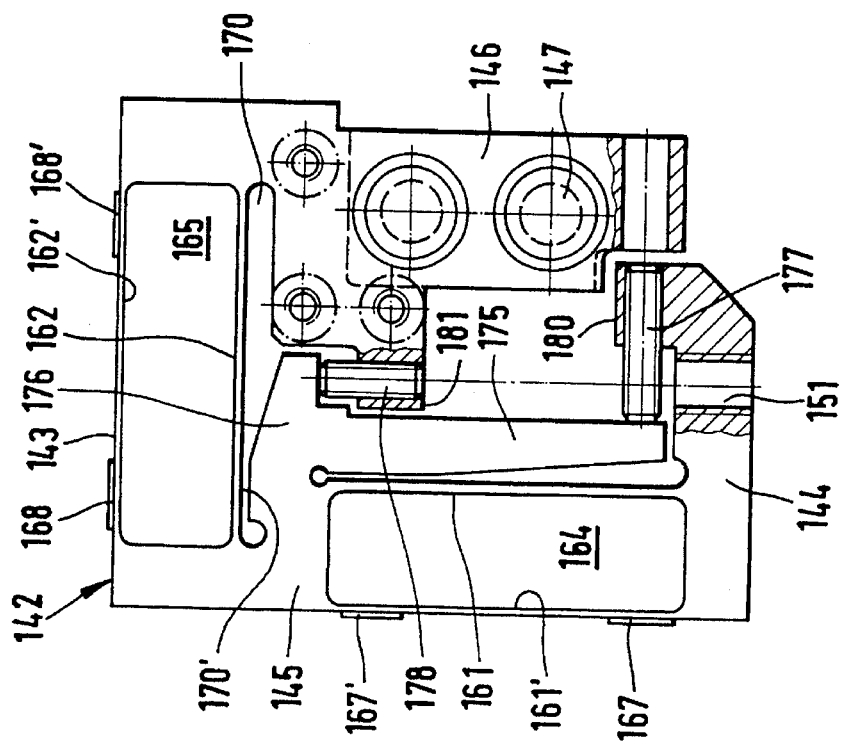
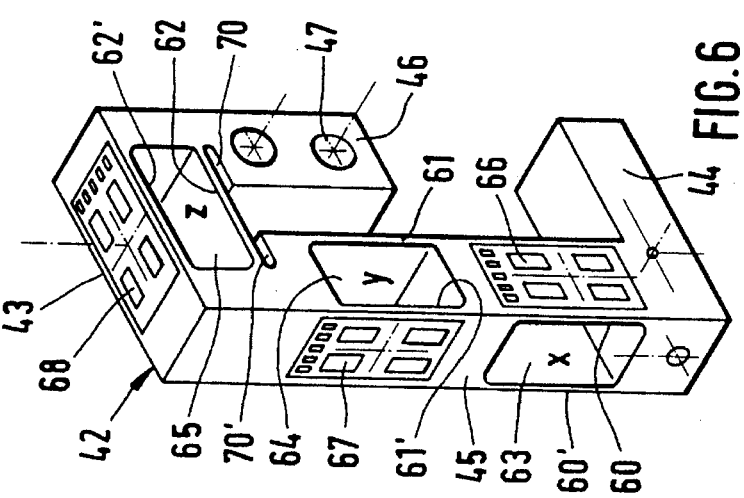
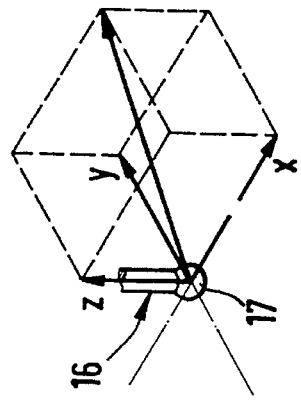

DEVICE FOR MEASURING DISTORTION IN CYLINDERS

BACKGROUND OF THE INVENTION

The present invention concerns a device for measuring distortion in cylinders. It includes a sensor projecting straight out of the end of a motion-transmitting arm. The arm can be both translated and rotated. The sensor accommodates a probe that probes the geometry of the surface of the cylinder.

A device of this type is known from French A 1 544 088. A sensor is mounted on the end of a measurement arm and accommodates a geometry-probing pin. The arm executes translational motions. The sensor pivots around an axis extending across the axis of the arm, rotating the pin more than 300° C. The rotation allows the pin to probe slotted cylindrical-surface geometries from the side once the arm with the sensor mounted on its head has been introduced through the slots paralleling the axis of the cylinder from the side into the cylindrical space being measured.

This known device, however, is totally unsuited for detecting cylinders with continuous surfaces. The present invention is intended to be inserted along the axis into a cylinder with a solid surface.

A device for this purpose is known form German Patent 3 024 331. It is intended for detecting distortion in cylindrical spaces. A measurement arm is introduced into the space and moved along its circumference. Mounted on the arm is a sensor that can execute translational motions along the axis of the arm. The sensor in turn accommodates a radial pin that probes the geometry of the inner surface of the cylinder being measured.

Although this known device has been proven for measuring distortions in cylinders and in particular in cylinders in internal-combustion engines, it is open to improvement in conjunction with the design of the sensor and its considerable radial extension.

The object of the present invention is accordingly a device for the aforesaid purpose that is simple and lacks external mechanisms for controlling the sensor.

With the aforesaid prior art as a point of departure, this object is attained in accordance with the invention by providing that the sensor comprises a distortion-measuring structure accommodated in the head of the surface-geometry probe and a chuck for axially secured and undeflected tensioning of the probe. The probe is an elongated geometry-probing pin. The structure is securely tensioned remote from the chuck in the vicinity of a structure-attachment section in the head. The structure includes at least one zone of attenuation between the chuck and the structure-attachment section. The zone of attenuation comprises a resilient section and a strain gauge.

Whereas the sensor in the device described in German Patent 3 024 331 travels along a rotating distortion-measuring arm, the device in accordance with the present invention features the head of a surface-geometry probe on the end of a translating and rotating motion-transmitting arm. A distortion-measuring structure is accommodated stationary in the head of the probe. The probe is a geometry-probing pin that extends out of the head. One end of the probe is accommodated in an appropriate chuck in the structure. The structure includes a zone of attenuation in the form of a resilient section. The zone of attenuation is between the probe-accommodating chuck and a structure-attachment section that ensures permanent attachment of the structure to the head of the probe.

One advantage of this embodiment of a distortion-measuring device is that the sensor is accommodated in the practically entirely enclosed head of the probe. One end of the geometry-probing pin is tensioned into an appropriate chuck in the distortion-measuring structure. The point at the other end of the pin engages the work surface that contains the distortions being measured. The pin will as it probes that surface execute minimal rotations around its point of tension and minimal translational measurement motions. Such motions can themselves generate deformations in the zone of attenuation in the from of a resilient section.

The distortion-measuring structure in one embodiment of the invention includes at least two separate resilient sections that operate at a right angle to each other. A structure of this type allows measurements to be taken along two perpendicular axes.

The distortion-measuring structure in accordance with the present invention can also of course be designed to allow measurements along three perpendicular axes. Such an embodiment will require in addition to the two resilient sections operating at a right angle to each other another resilient section operating at a right angle to the other two.

It will be practical for the zones of attenuation in the form of resilient sections in the distortion-measuring structure in accordance with the invention to be parallel springs. Parallel springs will allow especially precise guidance of the area of the structure that includes the probe-accommodating chuck.

The distortion-measuring structure in another important embodiment of the invention is in one piece. The zones of attenuation in this embodiment are obtained by removing material.

The one-piece distortion-measuring structure can be in the shape of a C, with two horizontals connected by an upright and with a structure-attachment section. The attachment section can project out of the end of one horizontal remote from the upright. The other horizontal can accommodate the chuck for securing the surface-geometry probe. The upright and/or the first horizontal can accommodate the zones of attenuation in the form of resilient sections.

The upright and or the one horizontal in the distortion-measuring structure in one sensible advanced version of this embodiment are penetrated by breaches in the vicinity of the zones of attenuation in the form of resilient sections, leaving edges in the form of leaf springs. The edges left in the form of leaf springs constitute the parallel springs.

It has been proven practical for the upright between the two horizontals in the distortion-measuring structure to be penetrated by two separated breaches at a right angle to each other.

The breach in the horizontal that connects the structure-attachment section to the upright in the distortion-measuring structure in another advanced version of the invention can be longer than the interval between the attachment section and the upright. This design will render the distortion-measuring device particularly sensitive at an angle to the measurement axes provided by the other resilient sections. This sensitivity can be increased even further if one incision extends into the upright and another into the structure-attachment section directly against the side of the leaf-spring like edge that demarcates the breach in the other horizontal.

Another important advanced version is characterized by a lever arm that extends parallel to at least one zone of attenuation in the distortion-measuring structure, is tensioned securely in the vicinity of one end of the zone of attenuation, and can be forced tight against another component of the structure at an angle to its length.

Such a lever arm will, depending on its tension allow limited preliminary deformation of the zones of attenuation and accordingly adjustment of the overall device. The lever arm can extend inside the upright and parallel with the zone of attenuation inside the upright and engage a tensioning screw at its free end. The tensioning screw will be accommodated in a threaded bore in an extension of one horizontal of the distortion-measuring structure. The lever arm can, however, also extend inside the distortion-measuring structure and parallel with the zone of attenuation in the horizontal that connects the upright of the distortion-measuring structure with its attachment section and be tensioned by a screw that engages its free end. In this case the tensioning screw will be accommodated in a threaded bore in an extension of the structure-attachment section paralleling the axis of the upright.

It will be obvious that within the scope of this advanced version one can also parallel the zone of attenuation in the upright and another can parallel the zone of attenuation in the horizontal that connects the structure-attachment section to the upright.

Another sensible advanced version is characterized in that the probe-accommodating chuck constitutes a rapid probe-replacement system comprising an extension that can be secured tight to one horizontal of the distortion-measuring structure, a base plate, a magnet in the center of the base plate, and a tensioning plate magnetically secured to the base plate. The probe is tensioned to the tensioning plate by known means.

Securing the tensioning plate to the base plate at three points has been demonstrated particularly practical. The three-point connection can comprise bearing balls accommodated in depressions in the tensioning plate distributed at intervals of 120° C. around the circumference. Each ball can rest against the surface of a cone or prism or against a plane.

BRIEF DESCRIPTION OF THE DRAWINGS

One embodiment of the invention will now be specified by way of example with reference to the accompanying schematic drawing, wherein FIG. 5 is a perspective view of a C-shaped distortion-measuring structure that can be accommodated in the geometry-probe head illustrated in FIG. 3, FIG. 6 is a schematic representation illustrating how the point of the probe can move along three axes, FIG. 7 is a view similar to that in FIG. 3 of a structure intended for measuring distortions along two perpendicular axes.

DESCRIPTION OF THE PREFERRED EMBODIMENTS

Figure 1:
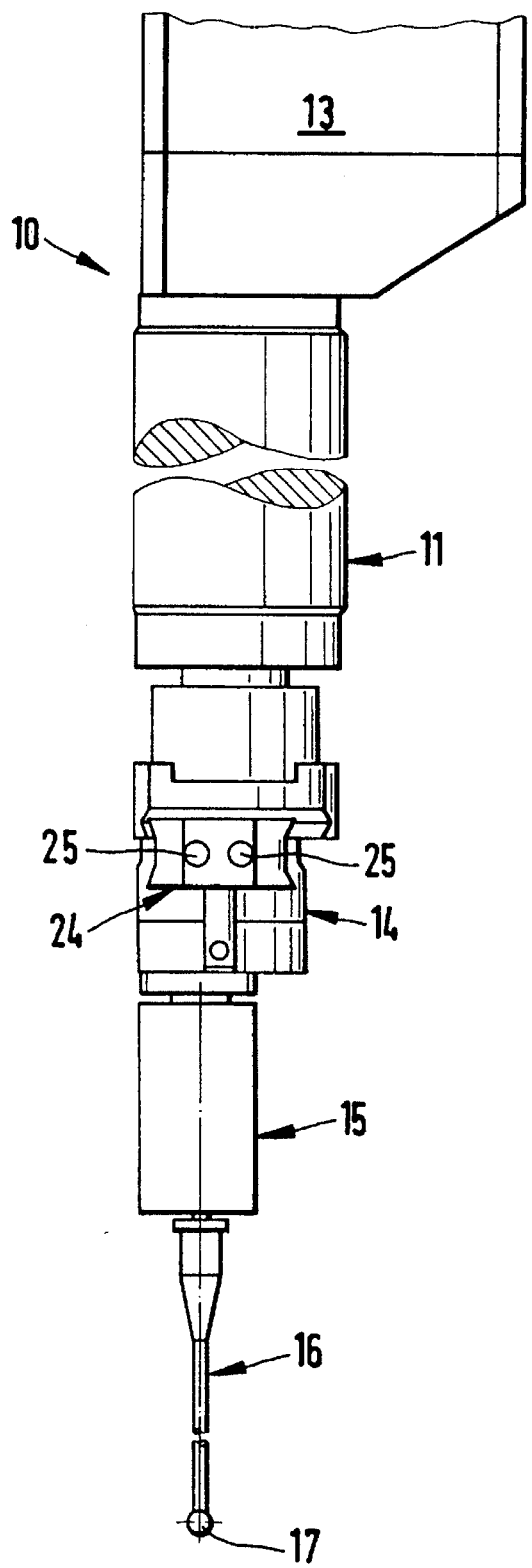
FIG. 1 is a side view of the overall distortion-measuring device with the head of a surface-geometry probe that can be displaced at an angle by means of a slide and is secured such that it can neither rotate nor travel back and forth on the end of a motion-transmitting arm that rotates and travels back and forth and with a probe that extends out of the end remote from the motion-transmitting arm.
Figure 2:
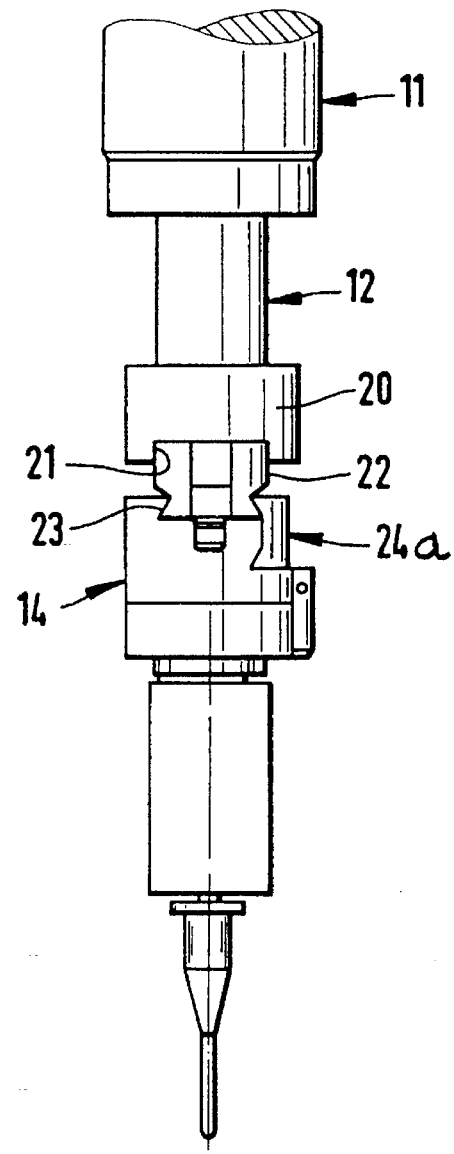
FIG. 2 illustrates the motion-transmitting arm with the geometry-probe head attached to it by the slide in a position in advance of that illustrated in FIG. 1.

A distortion-measuring device 10, illustrated essentially in its entirety in FIGS. 1 and 2 accommodates a motion-transmitting arm 12. Motion-transmitting arm 12 moves back and forth axially and rotates in a manner of no particular interest in the present context inside a positioning tube 11. The arm is rotated and moved back and forth axially by unillustrated motors accommodated in a housing 13. A geometry-probe head 15 projects axially such that it can neither rotate nor travel back and forth axially out of the end of motion-transmitting arm 12 by way of a slide 14. Slide 14 will be specified hereinafter. A surface-geometry probe 16 in the form of a geometry-probing pin with a point 17 extends out of the end remote from the arm.

Bent geometry-probing pins can of course be employed instead of the illustrated straight pin to probe the geometry of a cylindrical surface. The point of a bent pin will extend laterally beyond the circumference of the geometry-probe head.

An annular connector 20 is tightly secured to the end of the motion-transmitting arm. A depression 21 extends perpendicular to the longitudinal axis of the arm in the side of connector 20 remote from the arm. Depression 21 accommodates a guide 22. A dove-tailed groove 23 extends along the side of guide 22 remote from connector 20 perpendicular to the longitudinal axis of arm 12. Groove 23 is engaged by part of slide 14 and by a fitting ridge 24.

Strip 24a rests on a matching surface symmetrical to its longitudinal axis against slide 14 and is secured to the slide by screws 25 that extend through an unillustrated stack of washers.

The position of slide 14 can be varied transversely by a pin extending into the slide from the side remote from fitting ridge 24 at a right angle to groove 23 and to the longitudinal axis of motion-transmitting arm 12. The positioning pin fits snugly into the slide and has teeth that mesh with others on a rack between the dove-tailed surfaces of guide 22 and in one piece with it. When the slide-positioning pin is rotated around its longitudinal axis accordingly, the transverse position of slide 14 will be varied and hence the position of geometry-probe head 15 and surface-probing pin 16 in relation to the longitudinal axis of motion-transmitting arm 12.

Figure 3:
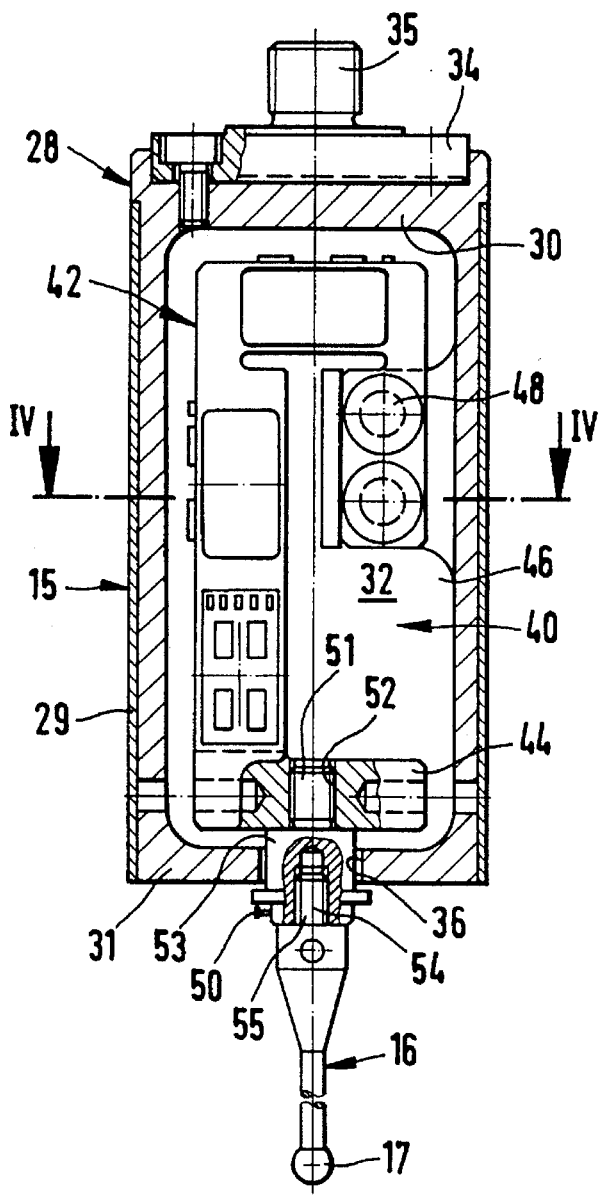
FIG. 3 is a longitudinal section at a scale larger than that of FIGS. 1 and 2 through the geometry-probe head with the distortion-measuring structure inside it and with a surface-geometry probe secured tight in a chuck in the structure.
Figure 4:
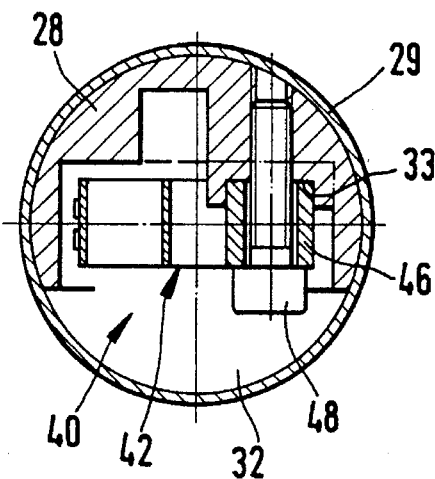
FIG. 4 is a transverse section through the geometry-probe head along the line IV—IV in FIG. 3.

Referring to FIGS. 3 and 4, geometry-probe head 15 comprises an elongated support 28 accommodated in a tubular housing 29 that extends essentially along its total length. Housing 29 has a wall 30 at one end and another wall 31 at the other. Between walls 30 and 31 is an accommodation 32 for a sensor that will be specified hereinafter. One side of support 28 is open in the vicinity of sensor accommodation 32 and provided with a bracket 33 for securing a distortion-measuring structure. A supporting plate 34 is secured to the wall 30 at one end of support 28 by a threaded bolt 35 that extends toward the side facing away from the surface-geometry probe. Bolt 35 is, as long as geometry-probe head 15 is mounted on slide 14, screwed into a bore that extends axially parallel toward motion-transmitting arm 12 from the side facing away from the arm and accordingly secures the head to the slide. The other end of support 28 is perforated by a hole 36 that extends coaxial with bolt 35.

Inside geometry-probe head 15 is a sensor 40. Sensor 40 comprises the basically C-shaped distortion-measuring structure 42 illustrated in FIG. 5. Structure 42 consists of two horizontals 43 and 44 connected at one end by an upright 45. Descending from the free end of horizontal 43 and essentially paralleling upright 45 is a section 46 that accommodates threaded holes 47. Structure 42 is attached at section 46 to the bracket 33 on measuring head support connector 20 by screws 48 illustrated in FIG. 3 and extending through holes 47. The horizontal 44 remote from section 46 accommodates a chuck 50. Chuck 50 in turn accommodates the surface-probing pin 16 extending out of the side of head 15 remote from motion-transmitting arm 12. Probe-accommodating chuck 50 includes a sleeve 53 secured in a threaded bore 52 in horizontal 44 by a threaded bolt 51 and projecting toward the side remote from structure-attachment section 46 and loosely through the hole 36 in the face 31 of support 28 remote from motion-transmitting arm 12. Sleeve 53 has a threaded bore 54 extending part-way through it. Bore 54 accommodates a threaded bolt 55 extending out from the side of surface-probing pin 16 remote from point 17.

Referring to FIG. 5, distortion-measuring structure 42 is secured to the bracket 33 on support 28 by screws 48 at structure-attachment section 46 alone and is otherwise accommodated loose all around inside the accommodation 32 in section 46. Pairs 60 and 60', 61 and 61', and 62 and 62'of leaf springs are as will be particularly evident from FIG. 5 accommodated in the horizontal 43 next to section 46 and separated from one another in the upright 45 between horizontals 43 and 44. Each pair of leaf springs demarcates a breach 64, 63, and 65 in upright 45 or in horizontal 43. Each spring consists of the narrow strip of material left on each side of the breach.

The distortion-measuring structure 42 illustrated in FIG. 5 is intended for a head accommodating a probe for detecting distortions in three dimensions. The breaches 63 and 64 that separately extend through upright 45 are perpendicular to each other. The pairs of leaf springs on each side of these breaches are accordingly also perpendicular to each other. These springs will accordingly allow measurements along the X and Y coordinates in FIG. 6. The breach 65 in horizontal 43 parallels the breach 64 in upright 45. The parallel springs 62 and 62' that demarcate breach 65 allow measurements along the Z coordinate perpendicular to the aforesaid two coordinates in FIG. 6.

The aforesaid distortion-measuring structure 42 is made of high-strength aluminum, and breaches 60, 61, and 62 and the parallel springs that constitute the zones of attenuation are electrical-discharge machined into upright 45 and horizontal 43, leaving edges in the form of thin leaf springs. One spring in each pair has a bridged strain gauge 66, 67, and 68 cemented to it. The strain gauges accommodate the deformations in the springs that occur when the distortions are measured and convert them into signals. There is also an incision 70 and 70'in upright 45 and in structure-attachment section 46 immediately adjacent to spring 62.

When the point 17 of surface-probing pin 16 encounters motion along the X coordinate as it probes the surface being tested, there will be a deformation in the zone of attenuation remote from the structure-attachment section in the upright 45 between the two horizontals, an elastic deformation, that is, in parallel springs 60 and 60'. Motions on the part of the point along the Y coordinate on the other hand will produce deformations in the second zone of attenuation in the upright and therefore in parallel springs 61 and 61'. Motions along the Z coordinate, finally will lead to deformations of the horizontal 43 between upright 45 and structure-attachment section 46 and hence to elastic deformations of the springs 62 and 62' on each side of breach 65. Considering the design of the parallel springs on each side of breaches 63, 64, and 65, as thin leaf springs, distortion-measuring structure 42 will be appropriated for extensive travel on the part of point 17.

Identical numbers plus 100 identify components illustrated in FIG. 7 that are similar to those illustrated in FIG. 5.

The distortion-measuring structure 142 viewed from the side in FIG. 7 is intended for a geometry-probe head that measures along two axes. This structure is also basically C-shaped and consists of two horizontals 143 and 144 connected by an upright 145 and of a structure-attachment section 146 extending out of the free end of one horizontal, all the way down to the other horizontal in the present case, however. This horizontal is provided with a threaded bore 151 for a probe-accommodating chuck. The upright 145 between the two horizontal is, like the upright in the previous embodiment, perforated by a breach 164, leafing thin edges and accordingly with a zone of attenuation acting along the Y coordinate and consisting of leaf springs 161 and 161'. The horizontal 143 between upright 145 and structure-attachment section 146 also includes a zone of attenuation comprising two leaf springs 162 and 162'. These springs demarcate a breach 165 through the horizontal and extend separately in a plane perpendicular to the longitudinal axis of the threaded bore 151 accomodating the probe-accommodating chuck. The result zone of attenuation is accordingly effective along the Z coordinate. As in distortion-measuring structure 42, strain gauges 167 and 167' and 168 and 168' are cemented to outer springs 161' and 162'. An incision 170 and 170' again extends directly adjacent to spring 162 into structure-attachment section 146 and upright 145. The structure-attachment section 146 extending out of the end of the horizontal 143 with the aforesaid zone of attenuation remote from upright 145 is, as in the previously specified embodiment, perforated by two threaded holes 147 and can be screwed tight to the bracket of a geometry-probe head by appropriate screws.

In contrast to the distortion-measuring structure 42 specified with reference to FIGS. 3 through 5, the structure 142 illustrated in FIG. 7 has a means of tensioning the zones of attenuation constituted by parallel springs 161 and 161' and 162 and 162'. To this extent a lever arm 175 and 176 extends parallel to the springs 161 and 162 inside the zones of attenuation. The free end of each arm is engaged by a tensioning screw 177 and 178. Lever arm 175 extends almost up to the horizontal 144 with the threaded bore 151 for the probe-accommodating chuck. The arm is tensioned in the vicinity of the remote end of breach 163. The tensioning screw 177 is accommodated in a threaded bore extending perpendicular to the axis of the bore 151 in a projection 180. Projection 180 extends from the end of the horizontal containing bore 151 toward the other horizontal of distortion-measuring structure 142. Lever arm 176 is tensioned in the vicinity of the upright-neighboring end of breach 165 and extends almost up to structure-attachment section 145. The screw 178 that engages this arm is accommodated coaxial with bore 151 in a threaded bore in a projection 181 extending from the structure-attachment section toward upright 145. Lever arms 175 and 176 can be forced by screws 177 and 178 toward the adjacent parallel springs 160 and 162. It will be evident that the parallel springs that constitute the zones of attenuation can be adjusted by tensioning the screws against the associated lever arms.

The surface-probing pin 16 secured in the probe-accommodating chuck specified with reference to FIG. 3 is screwed with a threaded pin 55 into a threaded bore 54 partway through an extension 53. Extension 54 extends through a hole 36 in the end 31 of head 15. The probe-accommodating chuck contains a threaded pin 52 accommodated in the threaded bore 51 in horizontal 44. To replace the probe, its threaded section must be screwed out of and its replacement into threaded bore 54.

Figure 8:
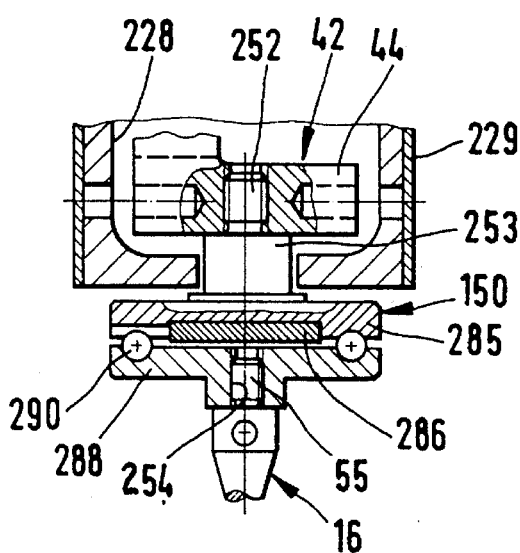
FIG. 8 is a view similar to that in FIG. 3 of a probe-replacement system with a magnetic chuck.

FIG. 8 on the other hand illustrates a probe-replacement system with a magnetic probe-accommodating chuck, whereby the reference numbers from FIG. 3 are increased by 200.

An extension 253 is screwed on a threaded pin 252 into a threaded bore 52 in distortion-measuring structure horizontal 44 in this probe-replacement system as well and extends through the hole 36 in the end 31 of the support. At the end remote from threaded pin 252, extension 253 has a base plate 285 with a magnet 286 at the center. The base plate acts as a bearing for a tensioning plate 288. The tensioning plate in this probe-replacement system constitutes the chuck that accommodates surface-probing pin 16. It is accordingly provided with a threaded bore 254 at the center. Bore 254, accommodates like the chuck 50 for threaded pin 55, a surface-probing pin 16. Between the base plate and the bearing 150 plate a three-point bearing operates in conjunction with balls 290 accommodated in depressions in the bearing plate. The balls are separated and distributed along the circumference at an angle of 120° against a conical, prismatic, or planar substrate.

We claim:

1. An arrangement for measuring distortion in a cylinder comprising: a sensor projecting straight out of an end of a motion-transmitting arm that can be both translated and rotated; said cylinder having a surface with a geometry; said sensor having a probe probing the geometry of said surface of said cylinder; said sensor having distortion-measuring means in a head of said probe and a chuck for axially secured and undeflected tensioning of said probe, said probe being an elongated geometry-probing pin; said distortion-measuring means being securely tensioned remote from said chuck in vicinity of an attachment section in said head; said distortion-measuring means including at least one zone of attenuation between said chuck and said attachment section and comprising a resilient section and a strain gauge in said resilient section, said resilient section being simultaneously a moving bearing for said probe and receiving signals describing said surface of said cylinder for high-sensitivity inspection of said surface; said motion-transmitting arm having an end moving said sensor relative to said surface in a system of independent coordinate axes; fastening means for holding said sensor securely on said end of said arm to maintain said sensitivity of the inspection; said distortion-measuring means being in one piece said distortion-measuring means being in shape of a C with two horizontals connected by an upright and with said attachment section projecting out of an end of a first horizontal remote from the upright, a second horizontal receiving said chuck for securing said probe and said upright, said first horizontal accommodating zones of attenuation in form of resilient sections; a lever arm extending parallel to at least one zone of attenuation in said distortion-measuring means and being tensioned securely in vicinity of one end of said zone of attenuation; said lever arm extending inside said upright and parallel with the zone of attenuation inside said upright and engaging a tensioning screw at a free end of said lever arm; said tensioning screw being accommodated in a threaded bore in an extension of said first horizontal of said distortion-measuring means.

2. An arrangement for measuring distortion in a cylinder comprising: a sensor projecting straight out of an end of a motion-transmitting arm that can be both translated and rotated; said cylinder having a surface with a geometry; said sensor having a probe probing the geometry of said surface of said cylinder; said sensor having distortion-measuring means in a head of said probe and a chuck for axially secured and undeflected tensioning of said probe, said probe being an elongated geometry-probing pin; said distortion-measuring means being securely tensioned remote from said chuck in vicinity of an attachment section in said head; said distortion-measuring means including at least one zone of attenuation between said chuck and said attachment section and comprising a resilient section and a strain gauge in said resilient section, said resilient section being simultaneously a moving bearing for said probe and receiving signals describing said surface of said cylinder for high-sensitivity inspection of said surface; said motion-transmitting arm having an end moving said sensor relative to said surface in a system of independent coordinate axes; fastening means for holding said sensor securely on said end of said arm to maintain said sensitivity of the inspection; said distortion-measuring means being in one piece said distortion-measuring means being in shape of a C with two horizontals connected by an upright and with said attachment section projecting out of an end of a first horizontal remote from the upright, a second horizontal receiving said chuck for securing said probe and said upright, said first horizontal accommodating zones of attenuation in form of resilient sections; a lever arm extending parallel to at least one zone of attenuation in said distortion-measuring means and being tensioned securely in vicinity of one end of said zone of attenuation; said lever arm also extending inside said distortion-measuring means and parallel with the zone of attenuation in the horizontal connecting the upright of said distortion-measuring means with its respective attachment section and being stressed by a screw engaging a free end of said lever arm; said tensioning screw being accommodated in a threaded bore in an extension of said attachment section paralleling an axis of said upright.

3. An arrangement for measuring distortion in a cylinder comprising: a sensor projecting straight out of an end of a motion-transmitting arm that can be both translated and rotated; said cylinder having a surface with a geometry; said sensor having a probe for probing the geometry of said surface of said cylinder; said sensor having distortion-measuring means in a head of said probe and a chuck for axially secured and undeflected tensioning of said probe, said probe being an elongated geometry-probing pin; said distortion-measuring means being securely tensioned remote from said chuck in vicinity of an attachment section in said head; said distortion-measuring means including at least one zone of attenuation between said chuck and said attachment section and comprising a resilient section and a strain gauge in said resilient section, said resilient section being simultaneously a moving bearing for said probe and receiving signals describing said surface of said cylinder for high-sensitivity inspection of said surface; said motion-transmitting arm having an end moving said sensor relative to said surface in a system of independent coordinate axes; fastening means for holding said sensor securely on said end of said arm to maintain said sensitivity of the inspection;

said distortion measuring means being in one piece; said distortion-measuring means being in shape of a C with a first horizontal and a second horizontal connected by an upright and with said attachment section projecting out of an end of said first horizontal remote from the upright, said second horizontal receiving said chuck for securing said probe and said upright, said first horizontal accommodating zones of attenuation in form of said resilient section.

4. An arrangement as defined in claim 3 wherein a breach in said first horizontal connects said attachment section to said upright in said distortion-measuring means, said breach being longer than a distance between said attachment section and said upright.

5. An arrangement as defined in claim 4, wherein an incision extends into said upright and another incision extends into said attachment section directly against a side of a leaf-spring like edge demarcating a breach in said second horizontal.

6. An arrangement as defined in claim 3, wherein said upright and said first horizontal in said distortion-measuring means are penetrated by breaches in vicinity of said resilient section.

7. An arrangement as defined in claim 3, wherein said upright between said two horizontals in said distortion-measuring means is penetrated by two separated breaches at a right angle to each other.

8. An arrangement as defined in claim 3, wherein a lever arm extends parallel to at least one zone of attenuation in said distortion-measuring means and is tensioned securely in vicinity of one end of said zone of attenuation.

* * * * *